(12) United States Patent
Van Gorkom et al.

(10) Patent No.: US 6,653,997 B2
(45) Date of Patent: Nov. 25, 2003

(54) DISPLAY DEVICE COMPRISING A LIGHT GUIDE

(75) Inventors: Gerardus Gegorius Petrus Van Gorkom, Eindhoven (NL); Pierre Leon Hubert Marie Cobben, Nijmegen (NL); Johannes Marra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 223 days.

(21) Appl. No.: 09/790,300

(22) Filed: Feb. 21, 2001

(65) Prior Publication Data

US 2001/0043171 A1 Nov. 22, 2001

(30) Foreign Application Priority Data

Feb. 24, 2000 (EP) .............................. 00200635

(51) Int. Cl.$^7$ ................................. G09G 3/34
(52) U.S. Cl. ........................ 345/85; 100/75.1
(58) Field of Search ................ 345/75.1, 84, 85, 345/108, 170, 76, 87, 90, 93, 95, 98, 102, 103, 105, 214, 100, 99

(56) References Cited

U.S. PATENT DOCUMENTS

| 4,113,360 A | 9/1978 | Baur et al. ............... 350/285 |
| 5,771,321 A | 6/1998 | Stern |
| 6,195,196 B1 * | 2/2001 | Kimura et al. ............ 359/295 |

* cited by examiner

*Primary Examiner*—Vijay Shankar
*Assistant Examiner*—Mansour M. Said

(57) ABSTRACT

A display device comprises row (5) and column (6) electrodes and a movable element (3) and means (17) for supplying voltages to the electrodes, wherein the row electrodes are situated on the movable element. The means supply, in operation, such voltages to the electrodes that use is made of the memory effect of the movable element. More in particular, the row electrodes are, in operation, supplied with "on", "off" and "hold" voltages and the column electrodes are supplied with "hold" and 'off'-voltages. Application of "on" voltages turns on the pixels in a row, simultaneous application of "off" voltages turns a pixel off. Application of a "hold" voltage to either one of the electrodes preserves the status of the pixel.

6 Claims, 5 Drawing Sheets

DISPLAY DEVICE COMPRISING A LIGHT GUIDE

FIELD OF THE INVENTION

The invention relates to a display device as defined in the pre-characterizing part of claim 1.

BACKGROUND AND SUMMARY

A display device of the type mentioned in the opening paragraph is known from U.S. Pat. No. 4,113,360.

Said patent describes a display device comprising a first plate of a fluorescent material, in which, in operation, light is generated and trapped (so that this plate forms a light guide), a second plate which is situated at some distance from the first plate and, between said two plates, a movable element in the form of a membrane. By applying voltages to addressable electrodes on the first and second plates and an electrode on the movable element, the movable element can be locally brought into contact with the first plate, or the contact can be interrupted. A transparent contact liquid is present on the contact surfaces. At locations where the movable element is in contact with the first plate, light is decoupled from said first plate. This enables an image to be represented. If the movable element is not in contact with the light guide, it is in contact with the second plate.

For a proper functioning of the display device, it is important that, on the one hand, the contact between the light guide and the movable element can be brought about and interrupted in an accurate and reliable manner, and that, on the other hand, the design is simple and does not require much energy to operate.

It is an object of the invention to provide a display device of the type mentioned in the opening paragraph, which provides a simple and yet reliable device.

To achieve this object, the display device in accordance with the invention is defined in claim 1.

In the known device, the position of the movable element, i.e. whether or not it makes contact with the light guide, is dependent on the applied voltages and on said voltages only. Positioning of the common electrode on the second plate allows a robust way of moving the element back and forth between the light guide and the second plate. In this way, selection of the movable element becomes independent of a force acting on the movable element directed away from one of the plates. In practice, this force may be influenced by local variation of, for example, the surface of the plates, the surface of the foil or the spacers. The side of the movable element, which side is in optical contact with the light guide, is very flat and smooth. The other side is much rougher. The largest variation will then be in the force which pulls the movable element away from the light guide. If this pulling force is smaller than the Van der Waals force between the surface of the light guide and the movable element and the electrostatic force between the surface of the light guide and the movable element, the movable element will stick to the light guide. Further advantageous embodiments of the invention are defined in the dependent claims.

A special embodiment of the display device in accordance with the invention is defined in claim 2. The forces acting on a movable element are not only dependent on the applied voltages, but also on other forces acting on the element and on its position vis-à-vis the electrodes. Said position is also dependent on the history of the element, i.e. previously applied voltages and position. The electric forces acting on the movable element are non-linearly dependent on the distances between the movable element and the electrodes. Because of the non-linear relationship between force and distance, the device exhibits a memory effect. When the movable element is near one of the electrodes, only a relatively large voltage difference between the electrodes can move the element to the other electrode. This, however, also means that once a movable element is in a certain position, it will stay in such a position, even if the voltages applied are changed, provided that they do not change to such a large degree that the movable element is moved to the other electrode. Since the device exhibits a 'memory effect', it is not only the momentary voltages applied which determine whether or not the movable element moves, but this is also determined by previously applied voltages. Using this insight, one or a number of advantages can be obtained. The device can be simplified, and/or the addressing voltages applied to the device can be simplified and/or the energy required can be lowered and/or the reliability of the device can be increased. Also grey levels can be made, as will be explained.

A further embodiment of the device in accordance with the invention is defined in claim 3. This configuration of the row and column electrodes allows a more economic power consumption because the total capacitance formed by the column electrodes and the row electrodes is usually smaller than the situation where the rows are situated on the active plate and the columns are situated on the movable element, because the position of the movable elements in the configuration is mostly directed towards the second plate.

A further embodiment of the device in accordance with the invention is defined in claim 4. Application of the upper value to the lower column electrode alone does not actuate the movable element at the crossing area of the relevant row and column electrodes. Only simultaneous application of the lower value to the column electrodes, and the upper value to the row electrode will actuate the element at the crossing areas. Actuating the movable elements becomes very reliable by this measure. Small deviations of applied voltages do not inadvertently switch an element. Basically, application of an 'on' signal to the row electrode will turn a pixel 'on' when it is 'off'.

A further embodiment of the device in accordance with the invention is defined in claim 5. In this way, the electrostatic force between the common electrode on the second plate and the row electrode on the movable element at the selected area becomes equal to zero and hence the reliability of the device is improved because the movement of the movable element away from the light guide is made independent of the variations in the pulling force.

A further embodiment of the device in accordance with the invention is defined in claim 6. Simultaneous application of two 'off' signals to row and column electrode(s) will turn a pixel 'off' when it is 'on', as will be further explained in the description.

A further embodiment of the device in accordance with the invention is defined in claim 7. In this way, the electrostatic force at the selected area between the row electrode on the movable element and the column electrode on the light guide area becomes equal to zero and hence the reliability of the device is improved because the movement of the movable element away from the light guide is made independent of the variations in the pulling force.

A further embodiment of the device in accordance with the invention is defined in claim 8. A turn-on addressing voltage is understood to mean a voltage value which, when combined with a given voltage at a crossing electrode, results in bringing the movable element into contact with the light guide at the crossing area. Likewise, a first turn-off voltage is understood to mean a voltage value which, when combined with a second turn-off voltage at a crossing row electrode, results in releasing the movable element from the light guide at the crossing area. This embodiment is based on the following recognition. When the first row electrode is supplied with an 'on' signal (turn-on voltage) and the crossing row electrodes are supplied with a predetermined voltage, pixels corresponding to areas where electrodes cross will be turned 'on' The step thereafter is used to supply the first turn-off voltage to a second set of column electrodes and to supply a second turn off voltage to the row electrode to bring the movable element at selected areas of the first row crossing the column electrodes back to the second plate after a first short interval. This means that the first line of picture elements remains visible, i.e. 'on'. After a second interval, the first turn-off voltages are supplied to all column electrodes and the second turn-off voltage is supplied to the row electrode. This will bring the movable element at all the crossing areas relating to the first row crossing the column, back to the second plate. The second interval relates to the brightness of the selected crossing areas corresponding to the information to be displayed. In this form, a single line of picture elements is displayed. It will be clear that this scheme can be expanded to more than 2 lines.

The great advantage is that, while the second (or third etc.) line of picture elements is formed, the first (second etc.) line of picture elements remains 'on'. The total intensity of the light is thereby increased substantially in comparison with arrangements in which (as, for instance, in classical CRTs) only one line of picture elements (or pixels) is activated ('on') at any one time.

This allows multi-line operation, i.e. more than one line (multi-line) is simultaneously active. The lines of picture elements (the video information) could be written in columns or rows. This also allows grey levels to be made.

A row or column electrode is active between the time when a turn-on voltage has been supplied to the row or column electrode until a turn-off voltage has been supplied to said row or column electrode.

BRIEF DESCRITPION OF THE DRAWINGS

These and other aspects of the invention are apparent from and will be elucidated with reference to the embodiments described hereinafter.

In the drawings.

The Figures are schematic and not drawn to scale, and, in general, like reference numerals refer to like parts.

DETAILED DESCRIPTION

Figure 1:
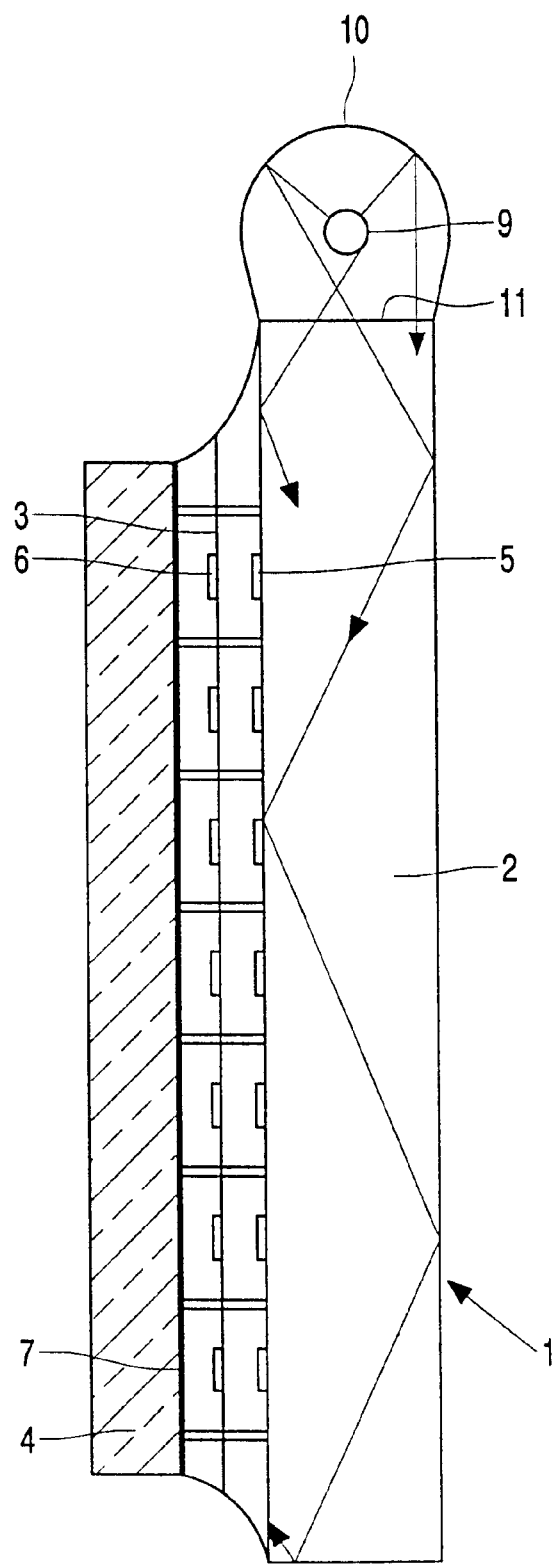
FIG. 1 is a cross-sectional view of a display device in accordance with the invention.
Figure 2:
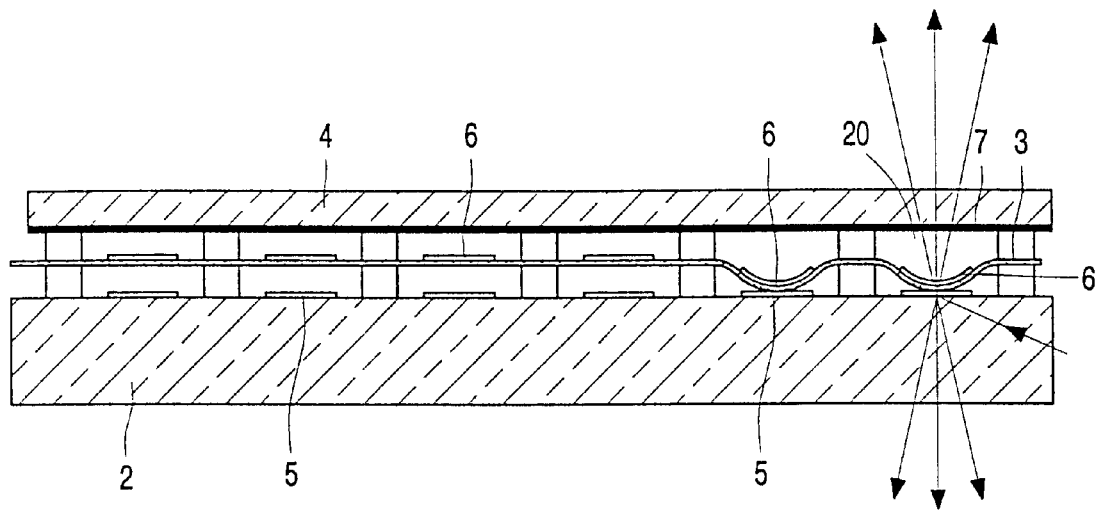
FIG. 2 shows a detail of the display device shown in FIG. 1.

FIG. 1 schematically shows a display device 1 in accordance with the invention. Said display device comprises a light guide 2, a movable element 3 and a second plate 4. Electrode systems 5 and 6 are arranged, on the surface of the light guide 2 facing the movable element 3 and on the surface of the movable element 3 facing the second plate, respectively. The surface of the second plate facing the movable element 3 is provided with a common electrode 7. Preferably, the common electrode 7 comprises a conducting layer. Such a conducting layer may be a semi-transparent metal layer, such as a semi-transparent aluminium layer, a layer of a transparent conducting coating such as indium tin oxide (ITO) or a mesh of metal tracks. In this example, the light guide is formed by a light-guiding plate 2. The light guide may be made of glass. The movable element may be made of a transparent polymer having a glass transition temperature of at least the operating temperature of the display device in order to prevent non-elastic deformation of the movable element. Practically, the operating temperature of the display device is in the range between about 0 and 70°. A suitable transparent polymer is, for example, parylene which has a glass transition temperature of 90°. The electrodes 5 and 6 form two sets of electrodes which cross each other at an angle of preferably 90°. By locally generating a potential difference between the electrodes 5, 6 and the movable element 3 by applying, in operation, voltages to the electrodes and the movable element 3, forces are locally exerted on the movable element, which pull the movable element against the light guide 2 or against the second plate 4. The display device further comprises a light source 9 and a reflector 10. Light guide 2 has a light input 11 in which light generated by the light source 9 is coupled into the light guide 2. The light source may emit white light, or light of any color, depending on the device. It is also possible that more than two light sources are present, for instance, a light source on two sides or on each side of the device. It is also possible to use light sources of different colors sequentially to form a white light display. The light travels inside the light guide and, due to internal reflection, cannot escape from it, unless the situation as shown in FIG. 2 occurs. FIG. 2 shows the movable element 3 lying against the light guide 2. In this state, a part of the light enters the movable element. This movable element scatters the light, so that it leaves the display device. The light can exit at both sides or at one side. In FIG. 2, this is indicated by means of arrows. In embodiments, the display device comprises color-determining elements 20. These elements may be, for example, color filter elements allowing light of a specific color (red, green, blue, etc.) to pass. The color filter elements have a transparency of at least 20% for the spectral band width of a desired color of the incoming light and a transparency in the range between 0 and 2% of the incoming light for other colors.

In another embodiment, a UV lamp is used and UV light is fed into the light guide and leaves the light guide and is incident on phosphor elements. The phosphor elements excited by the UV light emit colored light. The use of UV light and phosphor elements increases the efficiency of the display device. In still another embodiment, a light source emitting blue light may be used. The blue light is fed into the light guide and leaves the light guide and is incident on phosphor elements converting the blue light into red and green light. In this way, a very efficient conversion of the applied light is obtained.

Figure 3:
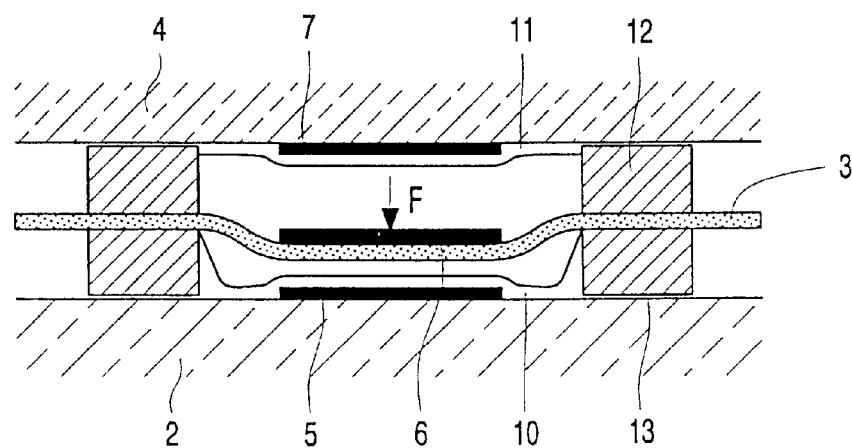
FIG. 3 shows a further detail of the embodiment of the display device shown in FIG. 1.

FIG. 3 shows a further detail of the display device shown in FIG. 1. The movable element 3 is positioned between the light guide 2 and the second plate 4 by means of sets of spacers 12 and 13. Electrodes 5 and common electrode 7 are covered by respective insulating layers 10 and 11 in order to preclude direct electric contact between the movable element 3 and the electrodes. By applying voltages to the electrodes and the movable element, an electric force F is generated which pulls the movable element against the electrode 5 on the light guide 2. The electrode 5 is transparent. The contact between the movable element and the light guide causes light to leave the light guide and enter the movable element at the location of the contact. In the movable element, the light is scattered and part of it leaves the display device via the transparent electrode 5 and the light guide 2 and a part leaves through the second plate 4. It is also possible to use one set of transparent electrodes, the other being reflective, which increases the light output in one direction.

Figure 4:
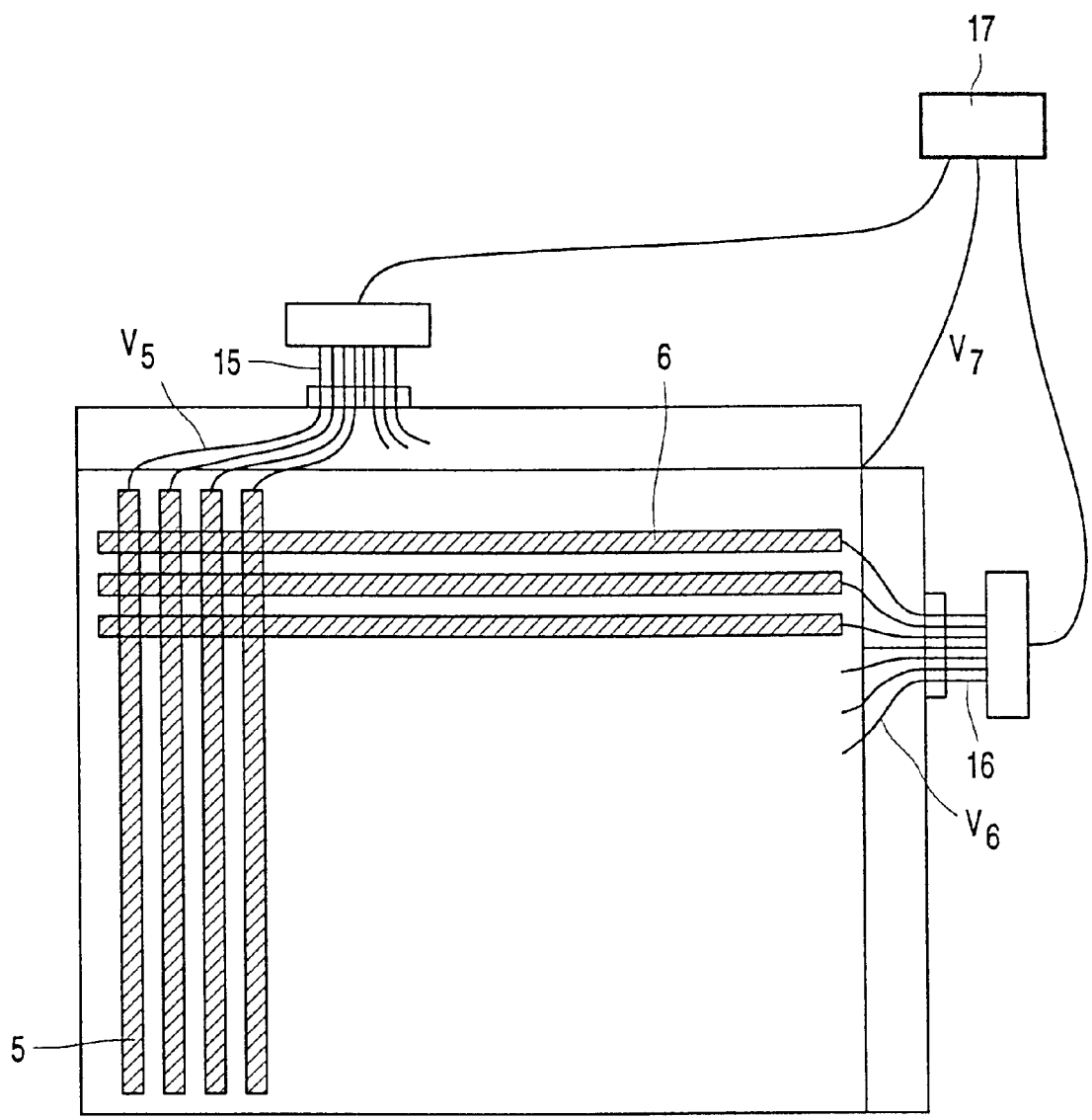
FIG. 4 is a plan view of the display device shown in FIG. 1.

FIG. 4 is a plan view of an embodiment of the display device shown in FIG. 1.

The electrodes 5 and 6 form a matrix structure. From a control unit 17, which comprises selection means, selection signals (electric voltages) are supplied to the electrodes 5 and 6 via the connections 15 and 16. This set of selection signals determines the set of potentials $V_5$ and $V_6$ on the electrodes 5 and 6, which are preferably covered by an insulation layer. Furthermore, the control unit 17 supplies a voltage $V_7$ to the common electrode 7 on the second plate 4. By applying suitable potential differences to the electrodes 5 and 6 and the common electrode 7, the movable element can be actuated, in operation, from and to the electrodes 5 and the common electrode 7 at the location of the selected crossings of the electrodes 5 and 6. Electrodes 5 form column electrodes, i.e. electrodes extending in the 'short' direction of the rectangular display, while electrodes 6 form row or line electrodes, i.e. electrodes extending in the 'long' direction of the rectangular display.

The force is locally exerted on the movable element by a potential difference between the row electrode 6 and the column electrode 5 and a potential difference between the row electrode 6 and the common electrode 7, the distances between the row electrode and column electrode and the distance between the row electrode and the common electrode and the size of the surface area of the electrodes. The movable element 3 can be actuated by these forces. In the absence of static charges the electrostatic force F which occurs between two electrodes (or between an electrode and the movable element) is approximately:

$$F = \tfrac{1}{2}\epsilon_0 (V/(d+\Sigma d_i/\epsilon_i))^2 \cdot S$$

where F is the force, V is the potential difference between the row electrode 6 and the column electrode 5, d is the distance between the row electrodes 6 on both sides of the movable element 3 and the column electrodes 5 or the common electrode 7 and $d_{10}, d_{11}$ is the thickness of any layer (e.g. layers 10,11 in FIG. 3) on the respective column electrode and the common electrode 7, $\epsilon_3, \epsilon_1$ represent the dielectric constant for respective layers 10,11 and S represents the surface area of the electrodes. In the absence of other forces, switching voltages of the order of 10 to 100 V can be used to actuate the movable element, i.e. cause it to locally make contact with the light guide or interrupt the contact with the light guide.

Actually, two electrostatic forces act on each element, one force (force $F_1$) being dependent, amongst others, on the difference in potential between the row electrode 6 on the movable element 3 and the common electrode 7 and the distance between the row electrode 5 and the common electrode 7 ($V_7-V_6$), and one force ($F_2$) being dependent on the difference in potential between row electrode 5 and column electrode 6 ($V_5-V_6$) and the distance between movable element 3 and electrode 6.

Figure 5:
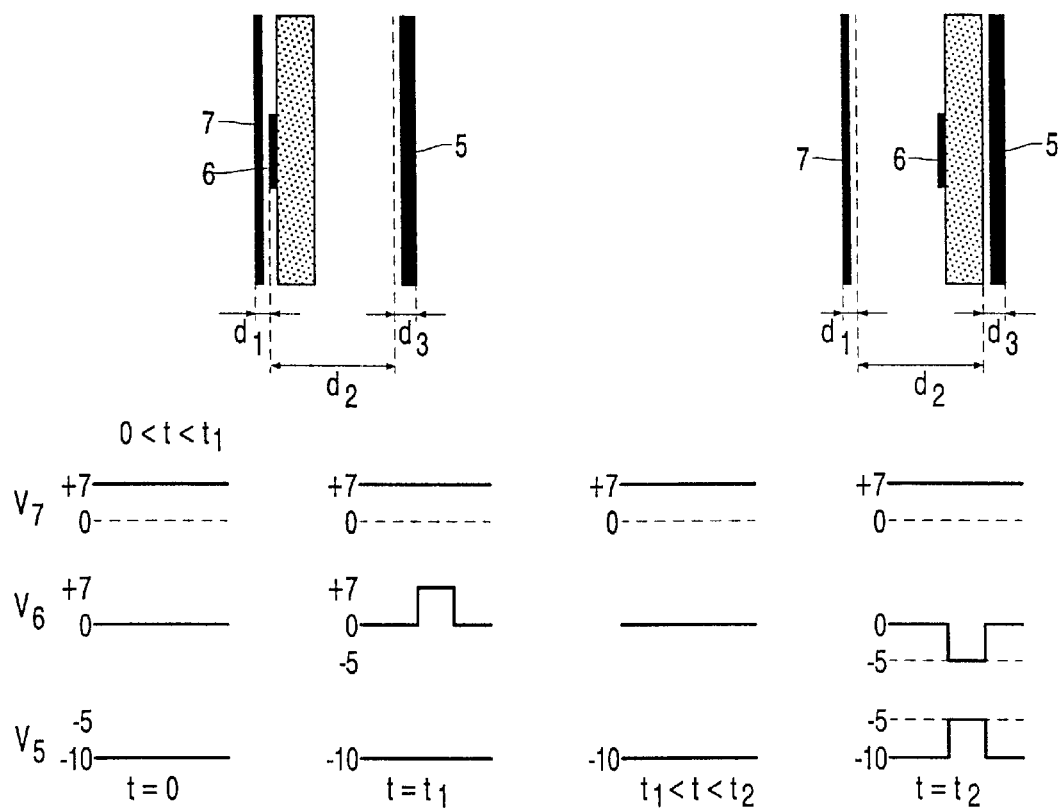
FIGS. 5 and 6 illustrate schematically the memory effect in a device according to an embodiment of the invention and how it is used.

When the movable element 3 is situated against the light guide 2, the total electrostatic force acting on element 3 in FIG. 5 is:

$$F_{total} = F_1 - F_2 =$$
$$C((V_6-V_5)^2/(d_3/\epsilon_3)^2 - (V_6-V_7)^2/(d_2+d_1/\epsilon_1)^2)$$

where C is a constant.

Depending on the total magnitude and direction of the electrostatic force, the element 3 is actuated or not, i.e. it will move or not move. The total electrostatic force acting on movable element 3 will change sign (thus changing from a force directed towards the element to a repulsive force) when $$(V_6-V_5)^2/(d_3/\epsilon_3)^2 = (V_6-V_7)^2/(d_2+d_1/\epsilon_1)^2$$

In the absence of other forces(e.g. elastic forces) in the situation depicted in FIG. 5, $V_6-V_7$ must be larger than $V_6-V_5$ (by a factor $(d_2+d_1/\epsilon_1)^2/(d_3/\epsilon_3)^2$ to actuate the movable element. Likewise, when movable element 3 is in an upward position, i.e. close to the common electrode 7, $V_6-V_5$ must be a factor $(d_2+d_3/\epsilon_3)^2/(d_1/\epsilon_1)^2$ larger than $V_6-V_7$ to move the movable element 3 to the light guide 2. This means that the fact whether or not the movable element 3 is actuated will not only be dependent on the voltages applied, but also on the position of the movable element vis-à-vis the electrodes, and said position is dependent on previously applied voltages, i.e. the history of the element. Thus a memory effect occurs.

Figure 6:
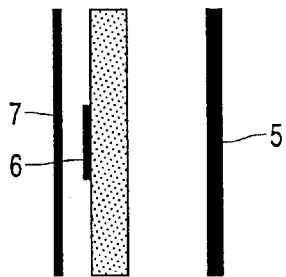

FIGS. 5 and 6 illustrate the operation of the device, FIG. 5 shows that, at t=0, movable element 3 is close to common electrode 7 on the second plate 4, separated by an insulating layer 11 at a distance $d_1$ from said electrode 7. For the sake of simplicity, the insulating layers 10,11 are not shown. No light will leave the movable element, i.e. the pixel is 'off'. The movable element is separated from electrode 5 by a relatively large distance $d_2+d_3$ At $t=t_1$, a pulse is applied to row electrode 6, reducing the difference in voltage between the row electrode 6 on movable element 3 and the common electrode 7 and increasing the voltage difference between the row electrode 6 and column electrode 5. This pulse is such that $(d_2+d_3/\epsilon_3) \times (V_6-V_5) > d_1/\epsilon_1 \times (V_6-V_7)$. Preferably, the difference $V_7-V_6$ is equal to zero. In this way a robust on-switching of the display device is obtained, which switching is independent of local variations of the surfaces of the light guide 2 and the movable element 3 and local variations in the spacers 12,13.

This will cause the movable element 3 to move into a position as shown at the right-hand side of FIG. 5. The movable element is in contact with the light guide 2 and thus light is extracted from the light guide and scattered, or in other words, the pixels of the relevant row of the display are 'on'. At $t_1 < t < t_2$, the voltages at the electrodes can be maintained at their predetermined values, while the position of the element is maintained as it was after the pulse at $t_1$. The pixels thus remain 'on'. At $t=t_2$, a first pulse and a second pulse are simultaneously applied to the row electrode 6 and the column-electrode, respectively, in order to reduce the difference in voltages $V_6-V_5$ between the row electrode 6 and the column electrode 5 and to increase the difference in voltages between row electrode 6 and common electrode 7, which will move the movable element 3 back towards the second plate 4 and the relevant pixel will be 'off'. Preferably, the difference $V_6 - V_5$ of the voltage of the first and second pulses is equal to zero.

The lower part of FIG. 5 shows the voltage $V_7$ on the common electrode 7, the voltage $V_6$ on the row electrodes 6 on the movable element 3 and the voltage $V_5$ on one of the columns 5 on the light guide 2, respectively. The applied voltages of the pulses are such that they alone do not cause the movable element 3 to be moved at other crossing areas, so the other pixels will remain in their actual state. Hence, only the simultaneous application of an 'off' pulse to both electrodes 5 and 6 will switch the element at the crossing to an 'off' position. In this way, a robust off-switching is obtained which has a reduced sensitivity to variations in surface of the movable element 3 and the light guide 2.

FIG. 6 shows an aspect of the present memory effect of the display device. In this Figure, at $t=t_2$, pulses are given on respective row electrode 6 and column electrode 5, which reduces the voltage difference between the row and the columns electrode at the crossing areas. However, this difference is not big enough to move the movable element 3, which will return to the second plate only at the crossing area corresponding to the selected pixels. The other addressed pixels will therefore not be affected and will remain in their present state.

Table 1 indicates the values for the voltage difference as a function of the voltages applied to electrode 5 ($V_5$) and electrodes 6 ($V_6$) and the action which will follow (pixels are turned on or off).

TABLE 1

Voltage difference $V_6 - V_5$ as a function of voltages applied to electrodes 5 and 6

| Voltages applied to 5 and 6 | $V_5 = V_{5L}$ 'hold-signal' | $V_5 = V_{5h}$ 'off-signal' |
|---|---|---|
| $V_6 = V_{6h}$ 'on-signal' | Row of pixels turned 'on' | Does not normally occur* |
| $V_6 = V_{6m}$ 'hold-signal' | no action | No action |
| $V_6 = V_{6L}$ 'off-signal' | no action | Pixel at cross-section turned 'off' |

*However, if the pulses are arranged in such a way that $V_{6h}$ and $V_{5h}$ do coincide, no action takes place.

Table 1 makes it clear that no action occurs if $V_6$ is $V_{6m}$ and $V_{5h}$ is either V5h or $V_{5L}$, respectively, i.e. a 'hold-signal' is given to the row electrode. Application of an 'on-signal' to the row electrode will turn the pixels 'on', while simultaneous application of 'off-signals' will turn a pixel 'off'. At $V_6=V_{6m}$, the status of the pixel is preserved, irrespective of the value of $V_5$. Pixels which are 'off' stay 'off' and pixels which are 'on' stay 'on'. $V_{6m}$ represents the value for which the status of each pixel is held, i.e. not changed, $V_{6h}$ represents the value for $V_6$ for which a pixel could be turned 'on', irrespective of the value for $V_5$ which is either VSL or $V_{5h}$ and $V_{6L}$ is the value for $V_6$ for which a pixel could be turned 'off', provided the value for $V_5$ is $V_{5h}$.

An important aspect of the memory effect as explained above is that multi-line addressing can be applied.

Figure 7:
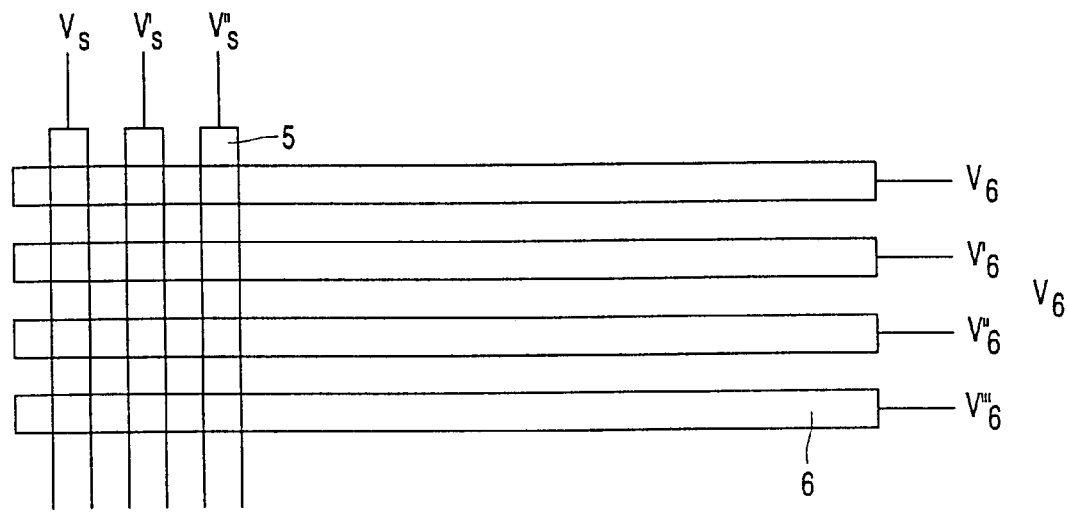
FIG. 7 shows schematically the matrix structure used to form an image.

FIG. 7 illustrates schematically multi-line addressing for a black and white display.

At t=0, at all crossings of the electrodes, i.e. at all picture elements, the movable element will not be in contact with the light guide. Thus, no light is emitted. At $t=t_1$, the voltage on the top row electrode, i.e. $V_6$, is changed to $V_{6h}$. At the crossing areas of the column electrodes 5 with the top row electrode 6, all the movable elements 3 will be brought into contact with the light guide 2 and light will be emitted. Then $V_6$ is changed to $V_{6m}$ and after a very short interval Δ 'off' voltages are supplied to those column electrodes that have to be switched 'off' in conformity with the video information relating to the top line applied to the column electrodes $V_5$, $V_5'$, $V_5''$ etc. This interval Δ should be as small as practically possible, for example, several microseconds. Simultaneously with the 'off' voltages applied to the column electrodes, a pulse $V_{6L}$ is given at the top row electrode. Now, only those pixels stay 'on' that are in conformity with the information of the top row of the image to be displayed. At the other crossing areas, no light will be emitted. Subsequently, the second of the top row electrode ($V_6'$) is supplied with voltage $V_{6on}$, while the voltage on the top row electrode is changed to $V_{6hold}$. Then $V_6$ is changed to $V_{6hold}$. After an interval Δ, the column electrodes are supplied with video information corresponding to the second line of the image and a pulse $V_{6off}$ is given at the second of the top row electrodes. This forms a second line of picture elements, while the pixels of the first line that were switched on are still emitting light. Subsequently the third of the top row electrodes is made 'active', i.e. supplied with $V_{6on}$, while the first and second row electrodes are held at a voltage $V_{6hold}$, i.e. remain active. In the further description, the process in which information is written on a line is referred to as 'made active', 'activation' or 'switching', when a line has been activated and, until it is blanked, such a line is referred to as 'active'. When the third line of picture elements is formed (made active), the first two lines are still emitting (active). In a simple black and white scheme, this process is repeated until N lines are written, then the first line is blanked and an N+1 line is switched on, whereafter the second N line is blanked and an N+2 line is switched on. Although, in this example, the image is formed line by line and the lines are activated, going from top to bottom, it will be clear that any sequence of activation of the lines may be used. For instance, sequences wherein subsequently the $1^{st}$, $6^{th}$, $11^{th}$, $2^{nd}$, $7^{th}$, $12^{th}$ lines etc. are activated are possible. This is done by supplying an 'off' voltage to the electrode corresponding to said line and at the same time supplying 'off' signals to all electrodes crossing said electrode.

Grey scales in the picture elements can be made by regulating the percentage of time when each crossing area emits light (duty cycle modulation).

Although a number or even all lines may be active for some time, only one line can be switched (made active or blanked) at any one time.

Figure 8:
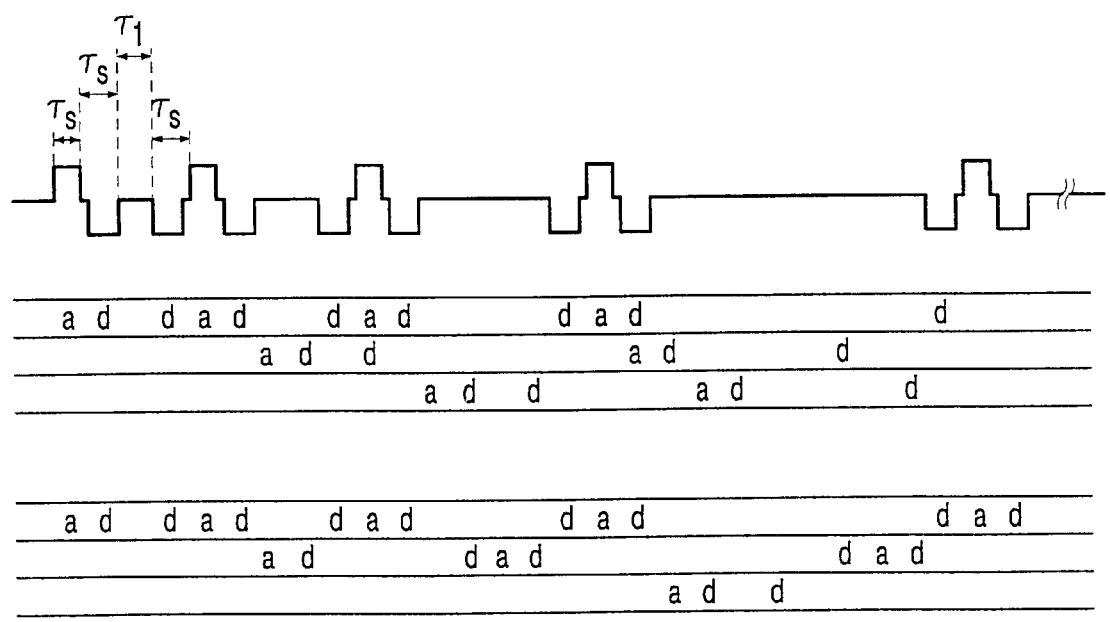
FIG. 8 illustrates schematically a possible addressing scheme to generate grey levels.

FIG. 8 illustrates this switching scheme for the generation of grey levels. The zigzag line at the upper half of the Figure illustrates the voltages being supplied to a first line. At t=0, a voltage $V_{on}$ is supplied to a row electrode 6 during a period $\tau_s$. This will activate the line corresponding to said row electrode. Video information (i.e. 'off' voltages for those crossing areas where the pixel is to be turned off) are supplied to the column electrodes crossing said row electrode. The voltage $V_{hold}$ is supplied to the row electrode. At $t=t_1$, the row electrode is supplied with a pulse having a voltage $V_{off}$ and duration $\tau_s$. After a short waiting time, the brightness information can then be changed for each electrode crossing the relevant line electrode. Thus, for a pixel the first period $\tau_1$ on, the second period $\tau_2$ off, the third period $\tau_3$ on, and so on until the 8-th period $\tau_8$ in an 8-bit grey level system corresponding to the desired intensity of the pixel, wherein the duration of an Nth period is equal to $2^{N-1}\cdot\tau_1$. At any one time, only one line may be switched (activated or deactivated), while $8(3\tau_s)$ must be smaller than the line time. This line time is defined as a frame time divided by the number of lines in the frame. For example, in a PAL_TV system, the frame time is 40 ms and the number of lines is 625. Consequently, the line time is 64 microseconds.

The lower half of FIG. 8 indicates, by means of time slots for a first electrode 1, a second electrode 2 and a third electrode 3, two different schemes of supplying voltages to the three electrodes. These schemes for 3 active lines, indicated by arrows, show that there are some time periods between a (activation) and d (deactivation). At these time periods, no line is switched.

Some absorption of light may occur in the light guide. By regulating time $\tau_s$ or the time periods indicated by the arrows, it is possible to regulate the percentage of time when a line is active. In a preferred embodiment of the invention, the time $\tau_s$ is smaller than at some distance from the light input. In this manner, the percentage of time that light is emitted near a light input is smaller than at some distance from the light input. This compensates for optical absorption in the light guide, so that a better uniformity is obtainable.

Furthermore, in order to obtain a display device which is able to handle television and computer images, a fast switching time can be obtained by applying a specific mass of the movable element 3 of the embodiment of FIG. 6, in the range between 1 and 3 gr/cm$^3$. In this way, switching times of the order of 1 or 2 microseconds can be obtained for pixel dimensions, of for example, 300×100 $\mu$m. The thickness of the movable element 3 is then in the range between 0.5 and 5 $\mu$m. To avoid sticking of the movable element 3 to the light guide or the second plate, the movable element comprises a first material having an elastic modulus which is preferably in the range between $10^8$ and $10^{10}$ N/m$^2$. For example, polyimide has an elastic modulus of $2.10^9$ N/m$^2$. Furthermore, it is advantageous to provide one or both sides of the movable element with a top layer comprising a second material having an elastic modulus which is higher than the elastic modulus of the first material. Such a top layer is made of, for example, SiN$_3$ and has a thickness of about 50 nanometers.

In order to obtain an efficient display device, the movable element should have a transparency of at least 30% of the incoming light. In this patent application, light has to be understood as radiation having a wavelength in the range between 370 and 800 nanometers.

In order to obtain a stable display the thermal expansion coefficient of the movable element is substantially equal to the thermal expansion coefficient of the light guide. For example, the thermal expansion coefficient of polyimide can be tuned to that of the light guide.

It is to be noted that the common electrode may be divided into several portions. Each portion is selectably connected to a voltage supply and may co-operate with a number of row electrodes facing each portion. The row electrodes on the movable element may be grouped together in sets of row electrodes corresponding to the portions of the common electrode. The row electrodes of each group may be connected to the corresponding row electrodes of the other groups. In operation, only the portion of the display can be activated which corresponds to a selected portion of the common electrode. In this way, the total number of connections to the row-electrodes on the movable element can be reduced.

It will be obvious that many variations are possible within the scope of the invention without departing from the scope of the appended claims.

What is claimed is:

1. A display device comprising a light guide, a second plate facing the light guide and the second plate, and selection means to locally bring the movable element into contact with the light guide, the selection means comprising a common electrode and row and column electrodes and means for applying voltages to the row and column electrodes and the common electrode, characterized in that the second plate is provided with the common electrode; wherein the selection means comprises means for applying voltages to the row and column electrodes in dependence on a voltage or voltages previously applied to the row and column electrodes; wherein the light guide comprises the column electrodes, and the second plate is provided with the common electrode and the movable element is provided with row electrodes; and wherein the means for applying voltages apply, in operation, a first set of voltages having a lower and an upper value to column electrodes, and a second set of voltages having a lower, a middle and an upper value to a row electrode crossing the column electrodes at crossing areas, the device being arranged in such a way that only simultaneous application of the upper value to the row electrode and of the lower value to the column electrodes changes the positions of the movable elements at the crossing areas.

2. A device as claimed in claim 1, characterized in that the lower value of the second set is equal to the voltage applied, in operation, to the common electrode.

3. A display device comprising:

a light guide provided with column electrodes;

a second plate facing the light guide and provided with a common electrode;

a movable element provided with row electrodes between the light guide and the second plate; and means for applying voltages to the common, row, and column electrodes to locally bring the movable element into contact with the light guide by applying voltages to the row and column electrodes in dependence on a voltage or voltages previously applied to the row and column electrodes, wherein the means for applying voltages apply, in operation, a first set of voltages having a lower and an upper value to a column electrode, and a second set of voltages having a lower, a middle and an upper value to a row electrode crossing the row electrode at a crossing area, the device being arranged in such a way that only simultaneous application of the lower value to the row electrode and of the upper value to the column electrode changes the position of the movable element at the crossing area.

4. A device as claimed in claim 1, 2 or 3, characterized in that the lower value of the first set is equal to the upper value of the second set.

5. A device as claimed in claim 1 or 3, characterized in that the means for applying voltages apply, in operation, a turn-on voltage to a first row electrode while simultaneously applying voltages to column electrodes crossing said first row electrode to bring the movable element into contact with the light guide at selected crossing areas of the first row electrode and the column electrodes, and subsequently apply a first turn-off voltage to a first column electrode while simultaneously applying a second turn-off voltage to a first row electrode to move the movable element towards the second plate, at a selected crossing area of the first column electrode and the first row electrode, the first turn-off voltage at the first column electrode having such a value that the movable elements at further crossing areas of the first column electrode and the row electrodes do not detach from the light guide, the second turn-off voltage at the first row electrode having such a value that the movable elements at further crossing areas of the first row electrode and the column electrodes do not detach from the light guide.

6. The device of claim 5, wherein the lower value of the first set is equal to the upper value of the second set.

* * * * *